United States Patent [19]

Raitmaa et al.

[11] Patent Number: 4,953,304
[45] Date of Patent: Sep. 4, 1990

[54] MASK COMPASS

[75] Inventors: Raimo Raitmaa, Kauniainen; Per-Olof Jansson, Helsinki, both of Finland

[73] Assignee: Oy Master Instruments Ltd., Finland

[21] Appl. No.: 343,826

[22] Filed: Apr. 27, 1989

Related U.S. Application Data

[63] Continuation-in-part of Ser. No. 152,239, Feb. 4, 1988, abandoned.

[30] Foreign Application Priority Data

Feb. 4, 1987 [FI] Finland ................................. 87 0472

[51] Int. Cl.$^5$ ............................................. G01C 17/02
[52] U.S. Cl. ..................................... 33/355 R; 33/364
[58] Field of Search ................. 33/355 R, 354, 348, 33/352, 333, 364, 274, 361, 359; 2/426–430

[56] References Cited

U.S. PATENT DOCUMENTS

| | | | |
|---|---|---|---|
| 1,043,478 | 11/1912 | Stephenson | 33/355 |
| 1,409,808 | 3/1922 | Wood | 33/333 X |
| 2,873,536 | 2/1959 | Rieger | 33/355 R |
| 2,878,578 | 3/1959 | Howard. | |
| 3,210,859 | 10/1965 | Fisk et al. | 33/355 R X |
| 4,402,140 | 9/1983 | Nagae | 33/272 |

FOREIGN PATENT DOCUMENTS

| | | | |
|---|---|---|---|
| 1140099 | 2/1962 | Fed. Rep. of Germany | 2/430 |
| 1527323 | 4/1968 | France | 33/364 |
| 234143 | 12/1944 | Switzerland | 33/364 |

Primary Examiner—Harry M. Haroian
Attorney, Agent, or Firm—Burns, Doane, Swecker & Mathis

[57] ABSTRACT

The invention relates to a mask compass comprising a case attached to the outer surface of glass of goggles. The compass box is placed inside the casing. Thus the checking of the compass does not interfere with regular diving movements and e.g. cause deviations from the right direction.

21 Claims, 2 Drawing Sheets

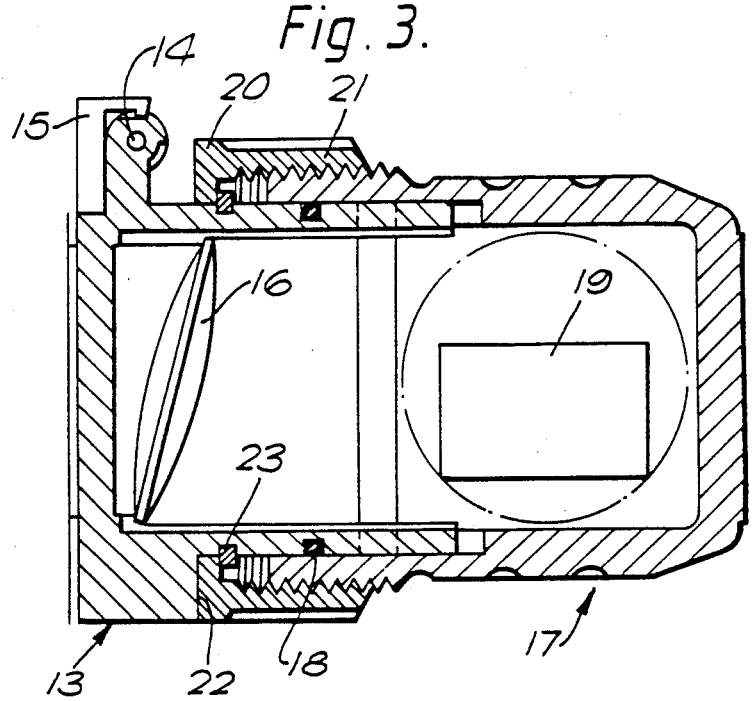
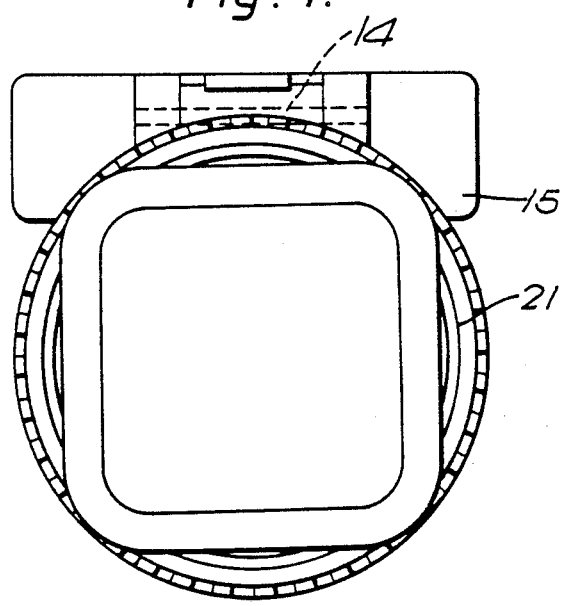

MASK COMPASS

RELATED U.S. APPLICATIONS

This is a continuation-in-part of application Ser. No. 152,239, filed Feb. 4, 1988, now abandoned.

BACKGROUND OF THE INVENTION

When trying to find his way in the dark or in tubid water, a diver needs a compass. The present-day diver's compasses are attachable to the wrist.

Under water the diver proceeds normally so that his arms are directed either along with the body straight rearwards or extended straight forwards. When the diver looks at the compass, he has to bend his arm to the proximity of his eyes. This movement may, however, cause a slight deviation from the desired direction of progress. When the compass has to be looked at several times, e.g., when a relatively long distance must be travelled without any fixed point, the total error resulting from these deviations may become fatal.

German Laid Open Publication No. 1,140,099 discloses a diver's mask having a compass and lens mounted on the inside surface of the glass. The Publication also suggests that the compass can be placed on the outside surface but in that case the lense is in any case placed inside the mask.

GENERAL DESCRIPTION OF THE INVENTION

In the mask compass now invented both the compass and optical means are placed in a casing attached on the outer surface of the glass of the goggles. The diver can observe his compass without movements of the arm causing deviations from the direction. It is a further advantage that the checking of the compass reading does not interfere with the regular diving movements that are most purposeful at each particular time. If necessary, however, the compass can be adjusted, e.g., focused, without taking the goggles off.

Preferred embodiments of the invention will be described in the following in detail.

DESCRIPTION OF THE DRAWINGS

In the drawings related to the description, FIG. 3 is a sectional side view of the compass casing of a second embodiment, and FIG. 4 is a front view of the casing of the second embodiment.

DESCRIPTION OF PREFERRED EMBODIMENTS

Figure 1:
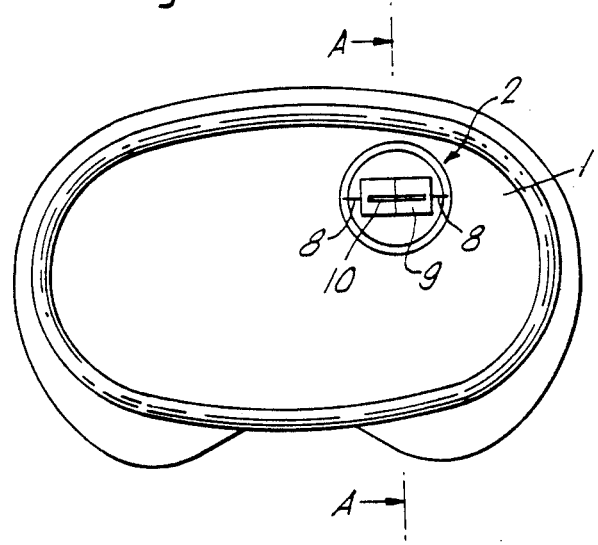
FIG. 1 is a schematical front view of diver's goggles to which a compass in accordance with the invention has been attached.
Figure 2:
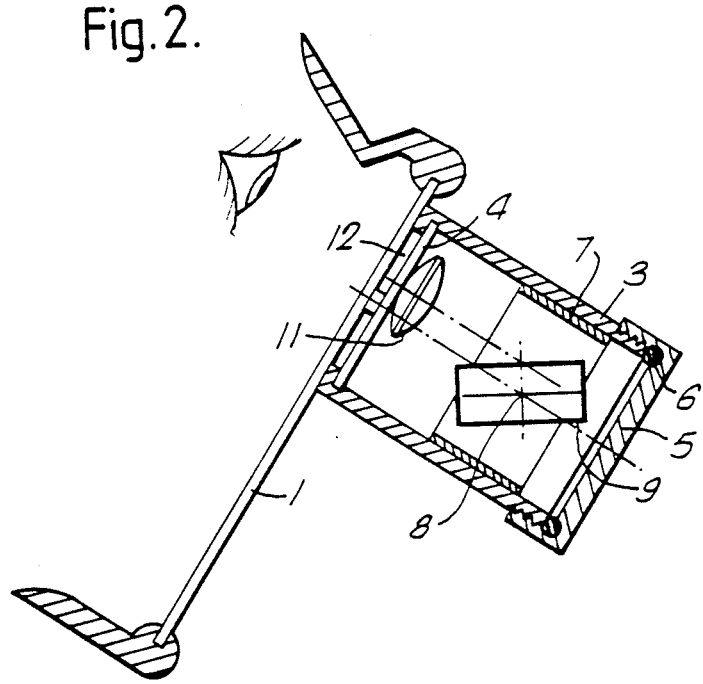
FIG. 2 shows the goggles as an enlarged sectional side view taken at the location of the compass.

Referring to FIGS. 1 and 2, the compass 2 is attached onto the glass 1 of the goggles to the front side of the glass, facing the left eye.

The outer casing of the compass 2 consists of an outer cylinder 3. The rear end of the outer cylinder, placed facing the glass, is closed permanently by means of a transparent cover 4. The front end is closed by means of a detachable front cover 5. The gap between the front cover and the outer cylinder has been made watertight by means of a seal 6. The axis of the outer cylinder is perpendicular to the face of the glass 1.

Onto the inner face of the outer cylinder 3, near the front end 5, a shorter inner cylinder 7 has been attached non-rotably. A compass box 9 made of a transparent material is mounted inside the inner cylinder by means of two shafts 8 placed on a straight line that is parallel to the face of the glass 1 and that passes perpendicularly through the mantles of the cylinders 3 and 7. The cylinders 3 and 7 as well as the cover 5 are made of a transparent material.

The compass box 9 is cylindrical. The mounting shafts 8 are perpendicular to the mantle of the compass box. A compass rose 10 with a magnetic needle is mounted on the central axis of the box by means of a shaft which is perpendicular to the mounting shafts 8. The compass rose consists of a round plate with a compass dial. The magnetic needle is fixed in the north-south direction of the dial. The box is weighted so that it, and so also the compass rose, are positioned horizontally. The box further has a sighting line or arrow, which is parallel to the plane passing through the axis of the compass rose and through the axis of the cylinders 3 and 7 which can be seen through the end 4. The sighting line can be seen in FIG. 1 at the front edge of the box.

The distance range of sharp near sight of an eye beings, depending on the person, from about 10 to 20 cm away from the eye. The compass box 9 is placed closer to the eye than the sharp range of sight of the eye. At the rear end 4 of the outer cylinder 3, facing the eye, there is a lens 11, which converges the picture of the compass rose 10 so that it can be seen sharply by the eye.

The outer cylinder 3 is attached to the face of the glass 1 so that a gap 12 washed by water remains between the glass and the rear cover. The gap prevents turbidity.

FIG. 2 shows the diver's head at the angle relative the horizontal plane at which the diver keeps his head when diving horizontally forwards. Thereat the diver observes the bottom ahead of him normally from underneath the compass 2 through the glass 1, and the compass does not disturb the observation of the bottom. If the diver wishes to check his course from the compass, he just has to raise his eyes a little.

The point of attachment of the compass 2 to the face of the glass 1 is preferably chosen in accordance with the diver's own anatomy. Thereat, a glue or tape is preferably used for fastening. If desired, the compass may also be attached through the glass by means of two O-rings.

The compass rose 10 should preferably be illuminated. The illumination may be accomplished by making the compass rose translucent with its bottom face made of a phosphorescent material. In more demanding applications, it is possible to use a fluorescent material and a suitable source of radiation, e.g., a $\beta$-radiator.

The distance of the inner cylinder 7 from the lens 11 is preferably made adjustable. In this way, the compass can be adjusted optimally for each person's eye. The adjustment can be accomplished by means of a slide and a screw.

The focal distance of the lens 11 is preferably chosen so that the edge of the compass rose 10 that is to be observed is seen as sharp as possible. The sighting line is preferably at the front edge of the box. The lens is fixed preferably so that it can be tilted or turned, which increases the adjustability of the compass attached to the glass to make it suitable for everybody.

According to an embodiment, the magnetic needle alone is journalled on the compass box, in which case the compass dial is provided on the box.

Instead of a lens, it is also possible to use some other suitable optical system, e.g., prisms or mirrors or combinations of prisms and mirrors. By means of prisms, an apparatus of shorter length is obtained without having to be content with an inferior depth of field. The prism systems are, however, significantly more expensive.

In the embodiment of FIGS. 3 and 4 there is a body cylinder 13 the front end of which is open and the rear end closed. The upper rear end of the body piece is provided with a hinge 14 by means of which the body piece is connected with a fastening piece 15 so that the body cylinder can be pivoted up and down. The fastening piece can be fastened to the glass of a mask by means of adhesive tape.

Inside the cylinder 13 there is a converging lens 16 placed on the axis of cylinder in a forwards inclined position so that light beans coming from the front end in the direction of the cylinder will bend downwards when going through the lens.

The front end of the body cylinder is closed by means of an elongate closure cylinder 17 the front end of which is closed and the rear end open. The closure cylinder is slidingly but nonrotably fitted on the body cylinder. The tightness of the fit is assured by a sealing ring 18 against water pressure of about 6 atm.

The cylinders 13 and 17 are made of transparent material. The color of the material is preferably light blue green. The side jackets of the cylinders and the front end of the closure cylinder are preferably made mat.

A compass box 19 (a fluid capsule) is gimballed inside the closure cylinder 17 as the compass box 8 inside the inner cylinder 7 in the embodiment of FIGS. 1 and 2.

The body cylinder 13 is further provided with a focusing ring 20 fitted rotably on the surface of the cylinder. The focusing ring comprises a forwards protruding ring flange 21 which is at a distance from the body cylinder. The inner surface of the ring flange is provided with a threading.

The rear end of the focusing ring 20 abuts against an enlargement 22 on the body cylinder 13. From the other side the focusing ring is held by a locking ring 23 placed in a groove on the body cylinder.

The rear end of the locking cylinder 17 is provided with a threading fitting together with the threading of the body cylinder 13. Thus, when the focusing ring 20 is rotated, the distance from the compass box 19 to the lens 16 can be adjusted.

If desired, the compass box may be weighted so that the axis of mounting of the magnet diverges from the vertical direction when diving in the normal position.

In principle, the glass of the diver's goggles may be made a refracting part of the optical system.

The mask compass according to the invention is suitable for other applications of use than diving, e.g., for sailboat racing.

Having shown and described preferred embodiments of the invention, those skilled in the art will realize that many variations and modifications may be made to affect the described invention and still be within the scope of the claimed invention.

We claim:

1. A mask compass mounted on goggles, comprising:

a watertight outer casing attached to the outer surface of a glass of the goggles, the casing having a transparent wall facing the glass;
a compass box mounted within the outer casing;
said compass box including a dial;
a compass needle mounted in the box; and
optical means mounted in the outer casing for enabling a diver to view the compass needle and dial.

2. Compass as claimed in claim 1 wherein the optical means includes a converging means for sharply focusing an image of said compass needle and said dial upon an eye of said diver.

3. Compass as claimed in claim 2 wherein the compass box is mounted within the outer casing by means of a shaft which is in a horizontal position when the diver's face is directed directly downwards.

4. Compass as claimed in claim 2 wherein the focal distance of the optical means system is sufficiently long to provide a necessary depth of field for the observation of the compass needle and the dial.

5. Compass as claimed in claim 2 wherein an angle of incidence of light on the converging means is adjustable by tilting said converging means in order to adjust a location of said focused image from said converging means.

6. Compass as claimed in claim 1 wherein the compass box is mounted on the outer casing by means of a shaft which is in the horizontal position when the diver's face is directed directly downwards.

7. Compass as claimed in claim 6 wherein the mounting shaft is perpendicular to a shaft journalling the compass needle.

8. Compass as claimed in claim 7 wherein a straight line passing through the mounting shaft intersects a straight line that passes through the shaft journalling the compass needle.

9. Compass as claimed in claim 1 wherein the focal distance of the optical means is sufficiently long to provide a necessary depth of field for the observation of the compass needle and the dial.

10. Compass as claimed in claim 1 wherein, in the optical means, the length of path of light from the compass needle to the eye is adjustable.

11. The compass as claimed in claim 10, wherein the compass box is adjustably mounted within the outer casing so that the distance between the optical means and the compass box is adjustable.

12. Compass as claimed in claim 1 wherein the outer casing is cylindrical.

13. Compass as claimed in claim 12 wherein the longitudinal axis of the cylindrical outer casing is perpendicular to the glass face.

14. The compass as claimed in claim 12, wherein the cylindrical casing comprises a body cylinder attached by its one end to the goggles and an end cylinder nonrotably but slidably in the direction of the cylinders mounted at the free end of the body cylinder, the compass box being mounted within the end cylinder.

15. The compass as claimed in claim 14, wherein the body cylinder comprises a ring rotably but nonslidably in the direction of the cylinders mounted on the body cylinder, the ring comprising a threading which fits with a threading on the end cylinder.

16. The compass as claimed in claim 1, wherein the compass box is pivotably mounted within the outer casing.

17. The compass as claimed in claim 10, wherein the compass box is weighted so that it tends to remain in a horizontal position.

18. The compass as claimed in claim 1, wherein said outer casing is placed above an eye of said diver so that said compass does not interfere with a normal forward vision of the diver and said optical means downwardly bends a light ray coming from said optical means to the eye.

19. The compass as claimed in claim 1, wherein the casing is pivotably attached to the goggles.

20. A mask compass mounted on goggles, comprising:
- a watertight outer casing attached to the outer surface of a glass of the goggles, the casing having a transparent wall facing the glass;
- a compass box mounted within the outer casing;
- said compass box including a dial;
- a compass needle mounted in the box; and
- optical means mounted in the outer casing for enabling the diver to view the compass needle and dial;
- wherein a gap is provided between the outer casing and the glass in the path of light of the optical means said gap being washed by water.

21. A compass for mounting on goggles, comprising:
- a watertight outer casing;
- means for attaching the outer casing to the outer surface of a glass of the goggles;
- said casing having a transparent wall adapted to face the glass when the compass is mounted to the glass;
- a compass box mounted within the outer casing;
- said compass box including a dial;
- a compass needle mounted in the box; and
- optical means mounted within the outer casing for enabling the diver to view the compass needle and dial, said optical means arranged within the casing in such a manner that when the compass is mounted to the glass, the optical means is on the outside of the glass of the goggles.

* * * * *